H. M. LALEY.
TIRE ARMOR.
APPLICATION FILED SEPT. 28, 1918.
1,351,664. Patented Aug. 31, 1920.
2 SHEETS—SHEET 2.
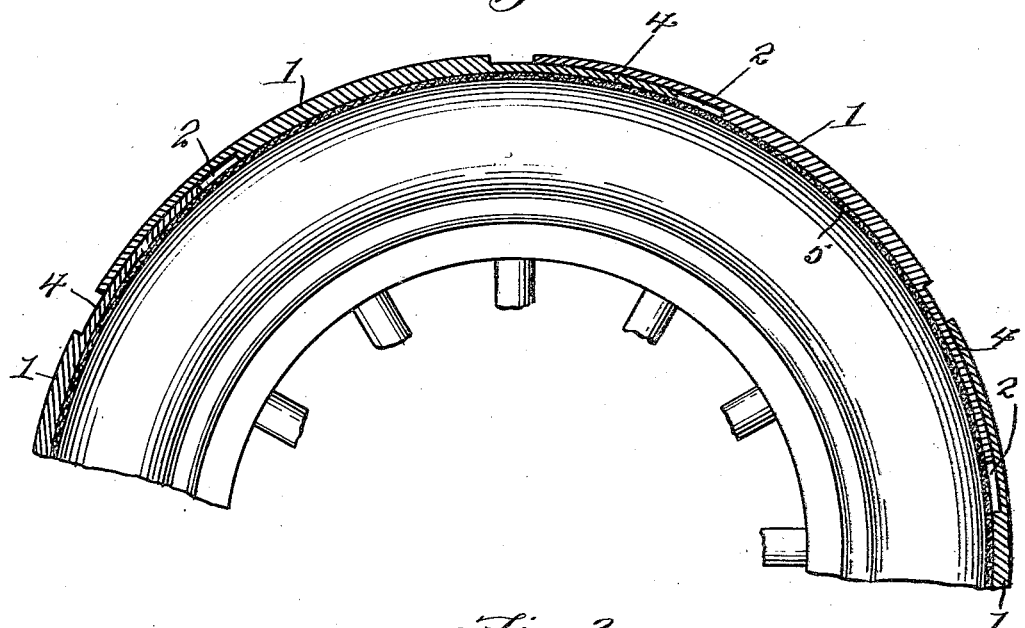
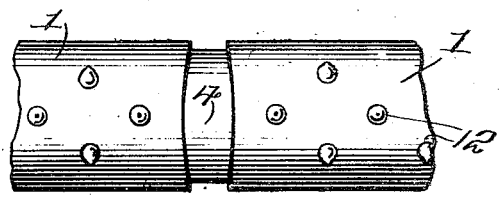
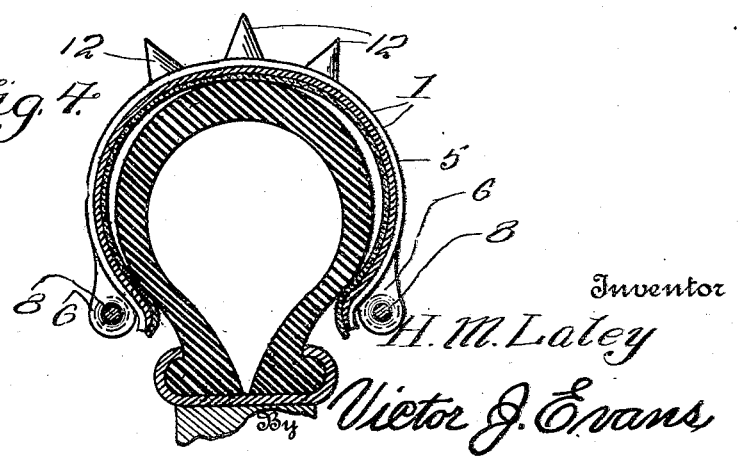

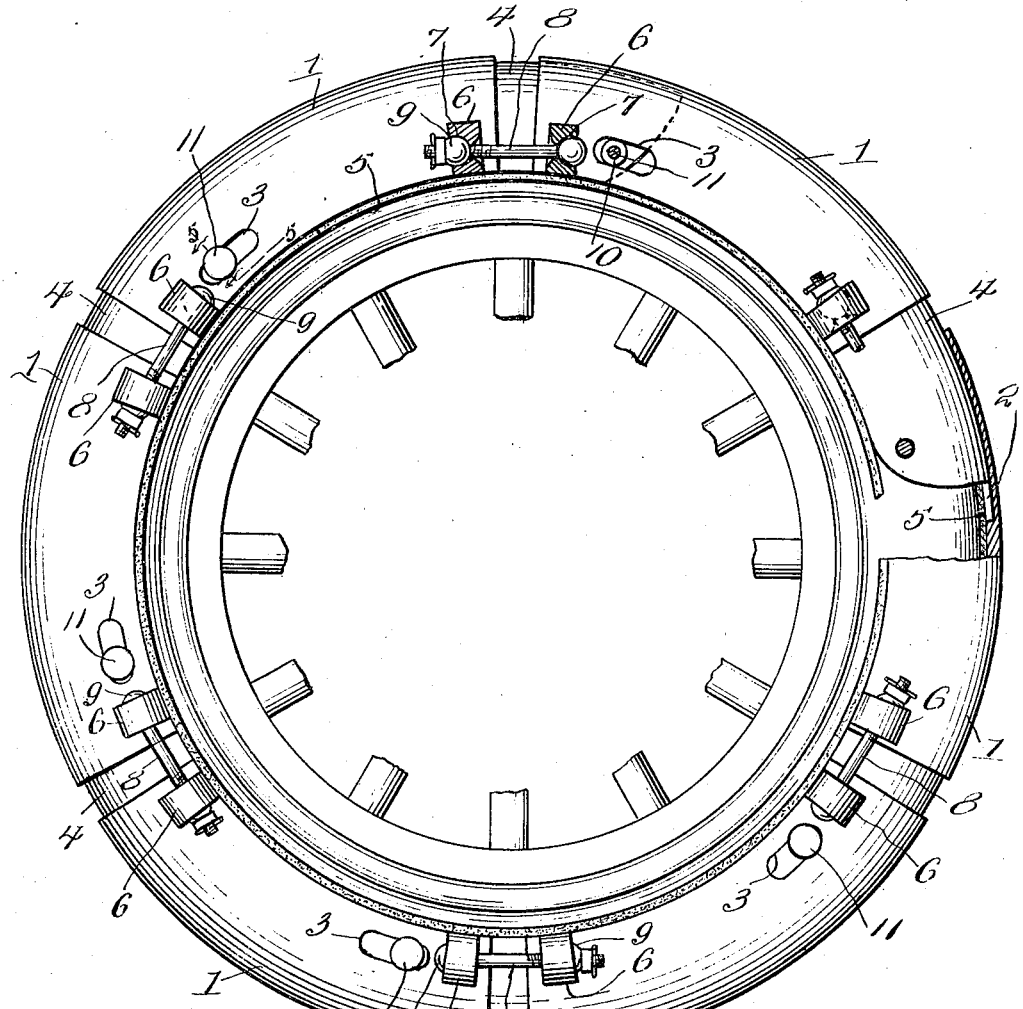

UNITED STATES PATENT OFFICE.

HARVEY M. LALEY, OF MONESSEN, PENNSYLVANIA.

TIRE-ARMOR.

1,351,664.  Specification of Letters Patent.  Patented Aug. 31, 1920.

Application filed September 28, 1918. Serial No. 256,047.

*To all whom it may concern:*

Be it known that I, HARVEY M. LALEY, a citizen of the United States, residing at Monessen, in the county of Westmoreland and State of Pennsylvania, have invented new and useful Improvements in Tire-Armor, of which the following is a specification.

This invention relates to armor adapted to be applied to pneumatic tires and it consists in the novel features hereinafter described and claimed.

An object of the invention is to provide an armor or protector of simple and durable structure which may be easily applied to the tire and when so applied will serve to effectually prevent puncturing of the same as well as avoid the liability of slipping or skidding of the wheels to which the invention is applied when the wheel is passing over a smooth surface.

With this object in view the armor comprises a series of sections connected together in a manner whereby they may articulate, the sections being adapted to be applied to the periphery of the tire. The end portions of the sections overlap each other and the means which secure them together are adapted to articulate. A strip of asbestos is located between the sections and the periphery of the tire casing and serve to prevent friction so that the armor will not damage the tire when applied.

In the accompanying drawings:

Figure 1 is a side elevation of a portion of a wheel with the armor applied and showing parts thereof in section;

Fig. 2 is a similar view illustrating several sections of the armor in section;

Fig. 3 is a reduced plan view of modified parts of the armor;

Fig. 4 is a transverse sectional view of the tire casing and armor as illustrated in Fig. 3;

Fig. 5 is a detail sectional view cut on the line 5—5 of Fig. 1; and

Fig. 6 is a detail perspective view of a pin and roller used in the armor.

The armor comprises a series of sections 1 and as the sections are all of the same design and configuration a description of one will answer for all. Each section is formed from a strip of sheet metal which is substantially semi-circular in cross section and arcuate in side elevation. Each section is provided at one end and at its inner side with a recess 2. The section is provided at points between its ends with slots 3. The section at its other end is provided with a reduced offset extension 4. The reduced extension 4 of one section is adapted to fit in the recess of the adjacent section. A strip of asbestos 5 is disposed under the sections and is adapted to lie against the periphery of the tire casing when the armor is applied.

Each section is provided at its opposite sides and in the vicinity of its ends with upright lugs 6. These lugs are provided with concaved sockets 7. A bolt 8 passes transversely through the adjacent lugs 6 and each bolt is provided at one end with a globular head adapted to fit in one socket and at its opposite end with a globular nut 9 adapted to fit in the socket of the adjacent lug.

Rollers 10 are mounted upon pins 11 which are attached to the extensions 4 of the sections and the said rollers are received in the slots 3 provided at the sides of the sections.

Inasmuch as the globular heads of the bolts and the globular nuts may turn or swing in the sockets, articulated means are provided for connecting the sections together. The presence of the armor does not detract from the resiliency of the tire, inasmuch as the end of one section is received in the end of the adjacent section and furthermore the spaces between the sections are closed, so they may not accumulate dirt.

If desired, the outer portions of the sections may be roughened by providing teeth 12 (see Figs. 3 and 4), thus preventing the armor from slipping or skidding when it is moving over a smooth surface.

By reference to the right hand side of Fig. 1 of the drawings and to Fig. 2 thereof, it will be seen that the reduced ends 4 of the respective sections 1 do not contact with the end walls of the recesses 2.

Having thus described the invention, what is claimed as new, is:—

A tire armor comprising a plurality of circumferentially extended transversely bowed sections arranged in overlapping relation, each of said sections having one of its ends recessed and its other end reduced to be received in the recess of the co-acting section, an articulated connection between the respective sections, and means between the said sections for limiting an articulated movement there between.

In testimony whereof I affix my signature.

HARVEY M. LALEY.